United States Patent [19]

Schmid et al.

[11] Patent Number: 4,718,346

[45] Date of Patent: Jan. 12, 1988

[54] EXPLOSIVE CHARGE FOR THE EXPLOSIVE WELDING OF LARGE DIAMETER PIPES, AND A METHOD FOR ITS MANUFACTURE

[75] Inventors: Hermann Schmid; Per Sjöberg; Leif Svensson, all of Karlskoga, Sweden

[73] Assignee: Nobel Kemi AB, Karlskoga, Sweden

[21] Appl. No.: 876,500

[22] Filed: Jun. 20, 1986

[30] Foreign Application Priority Data

Jun. 20, 1985 [SE] Sweden ............................. 8503079

[51] Int. Cl.⁴ ............................................. F42B 1/02
[52] U.S. Cl. .................................... 102/310; 102/318; 102/321; 102/322; 102/323; 102/331
[58] Field of Search ............... 102/306, 310, 312, 313, 102/318, 322, 323, 330–332, 321

[56] References Cited

U.S. PATENT DOCUMENTS

| | | | |
|---|---|---|---|
| 4,072,702 | 2/1978 | Huskins | 260/453 AB |
| 4,198,454 | 4/1980 | Norton | 102/303 X |
| 4,216,039 | 8/1980 | Pierce | 149/19.8 |
| 4,231,506 | 11/1980 | Istvannfy et al. | 228/109 |
| 4,280,407 | 7/1981 | Allen et al. | 102/320 |
| 4,354,433 | 10/1982 | Owen | 102/303 X |
| 4,357,873 | 11/1982 | Jager | 102/310 |
| 4,418,622 | 12/1983 | Foster et al. | 102/331 X |
| 4,619,201 | 10/1986 | Romer et al. | 102/283 |

FOREIGN PATENT DOCUMENTS 434019   7/1984  Sweden.
1297708  11/1972  United Kingdom.

Primary Examiner—Peter A. Nelson
Attorney, Agent, or Firm—Pollock, Vande Sande & Priddy

[57] ABSTRACT

The disclosure relates to an explosive charge intended for the explosive jointing of, primarily, large-diameter pipes, such as pipeline pipes. The charge according to the invention is intended to be delivered as a unit ready to be applied immediately on site in the pipe. The only item which is not intended to be included is the detonator which is mounted in place immediately prior to blowing the charge. The charge includes, apart from explosive, also a polymer binder of a more closely defined type and gas blisters preferably in the form of microspheres of glass or plastic and metal or metal oxide powder. The scope of the invention embraces the general configuration of the charge and all components included therein.

22 Claims, 8 Drawing Figures

EXPLOSIVE CHARGE FOR THE EXPLOSIVE WELDING OF LARGE DIAMETER PIPES, AND A METHOD FOR ITS MANUFACTURE

TECHNICAL FIELD

The present invention relates to an explosive charge intended for explosive jointing of metals, primarily in the form of large-diameter pipes, such as pipelines for oil or gas. The invention also relates to different methods for manufacturing the charge in question.

THE STATE OF THE ART

Explosive jointing can be effected either by explosive welding or by some type of shrink joint.

The art of explosive welding has been developed since the Second World War. Although the method is more rapid and provides a stronger joint than conventional welding, it is still employed on a much more modest scale than conventional welding. This is because of such factors that the use of explosives creates noise and labor safety problems, with the result that the method cannot be used in densely populated areas. Consequently, it is only employed where it would afford considerable advantages as compared with conventional welding.

One of the industrial processes which currently places the severest demands on welding is the laying of pipelines from oil and gas sources to the refining industries. These pipelines often stretch across deserts and other inhospitable terrain, or on the sea bed, in other words in regions where problems involved in noise and safety can be resolved. This may constitute a very large market for explosive welding, since it can entail increased pipeline laying speeds. For this market, a charge is required which gives a guaranteed result and is also easy to use. The present invention relates to such a charge. The charge may also be used for shrinkjointing of pipelines etc.

In all explosive welding, the metal surfaces which are to be joined and the charge are arranged in accordance with FIG. 1. When the charge detonates, the upper surface accelerates down towards the lower surface accordingly as the detonation front is propagated through the charge, see FIG. 2.

If, in this process, the acceleration provides sufficiently high velocity, such a powerful surface pressure will occur in the interface layer at the collision surfaces that the viscous forces are overcome and the material begins to flow. Flow takes place within but a very thin surface layer on the material surfaces, where the materials flow into one another. The joint which is thereby created is just as strong as the materials themselves. If two sheets of the same material are joined together, the joint will become a metallurgically continuous transition between the materials. This explains why an explosion-welded joint is at least as strong as the materials in the joined sheets. In terms of energetics and thermodynamics, the process may be described such that the expansion work of the detonation is converted into deformation work via the kinetic energy of the upper plate. A longer acceleration travel gives higher collision velocity and, thereby, flow will be more easily achieved, but the acceleration travel also entails a cold-working process. It is seldom possible to permit too high a degree of cold-working, for which reason as short an acceleration travel as possible should be aimed at. Its order of magnitude is normally one or a few millimeters.

A buffer (see FIG. 1) of a non-explosive material is disposed between the charge and the upper plate and evens out the impulse against the upper face of the upper plate. In this manner, the surface is protected from cracking. An obstruction (see FIG. 2) on the upper side of the charge increases the impulse the detonation imparts to the upper plate.

The most important property of the charge is the impulse it transmits to the upper plate. The impulse determines the acceleration of the upper plate and thereby the collision velocity. Theoretically, the impulse is the time integral of the pressure the detonation imparts to the upper plate.

$$\int f \cdot dt$$

wherein f is the force per surface unit against the upper plate and dt is the time differential. This integral is very difficult to determine experimentally. We have instead departed from the hypothesis that the calculated detonation pressure is an adequate working parameter. The pressure is calculated using the formula:

$$\frac{1}{4} \times \rho \times d_v^2$$

wherein $\rho$ is the density and $d_v$ is the velocity of detonation (VOD).

It is possible to measure the VOD. By VOD, we take to mean the average velocity through the charge obtained by registering the time it takes for the detonation front to be propagated from the beginning to the end of the charge. In and of itself, the VOD is another critical parameter for the charge. The VOD may not exceed sonic velocity in the material to be joined together, since this would give rise to the risk of debilitations in the joint.

Thus, the charge is to provide an impulse which is sufficient to cause the materials to flow but is insufficient to destroy the material. At the same time, the VOD of the charge may not exceed the sonic velocity of the material.

Field trials have shown that neither octogene, TNT nor pentyl can be employed in their unadulterated form for explosion welding of metal, since their VODs exceed the sonic velocity in the materials contemplated here. Thus, the charge must consist of at least one further component which is not an explosive. This further component is employed to dilute the amount of explosive in the charge, with the result that the VOD is reduced. According to the invention, this is realized by casting the charge in a thermosetting resin system. Such a charge possesses the advantage that it does not segregate. It would be a serious drawback to employ a particulate mixture. When the charge segregates, its effect will be jeopardized.

However, when the charge is diluted, a new problem arises. When the VOD falls, the critical diameter of the charge increases. This thereby creates the risk of a hiatus in the detonation. The sonic speed in steel lies at approx. 5,000 m/sec. and the VOD of the charge must, hence, be well below this level.

TABLE

| Explosive | Content (%) | Thermosetting resin (%) | VOD (m/sec) | Complete detonation |
|---|---|---|---|---|
| TNT | 70 | 30 | 3,350 | no |
| HMX | 30 | 70 | 3,350 | no |
| PETN | 35 | 65 | 4,600 | yes |

Mixtures of explosive and thermosetting resin have been tested according to the table above. The dimensions of the charges were 30/200/200 mm. Similar results have been presented by others (Ref. 1).

It is well-known in the Art to reduce the critical diameter of low velocity charges by adding air blisters (Ref. 2). When the detonation pressure acts on a gas blister, this is rapidly compressed. The compression thermal energy does not have time to dissipate and this results in a locally high temperature which initiates proximal explosive particles. Such gas blisters can be added by casting the charge in such a manner that it will be porous, for example by an addition of a frothing agent. The VOD will then be approx. 1,000 m/sec. lower when 10% by volume of air blisters is admixed to a pentyl charge. The critical dimension will then be less than 20 mm. If the charge is obstructed (or 'tamped') on its upper side, its critical diameter falls to less than 15 mm.

By an addition of different metal and metal oxide powders to a charge, it is possible to increase the density of the charge and thereby its detonation pressure, without exceeding the critical VOD.

As has been mentioned above, explosion welding could well be put to great advantage in pipeline constructions and this branch of industry has long shown considerable interest in such welding. There are also a large number of meritorious proposals in patents and trade articles for reducing such welding into practice, but no commercially viable method has yet been evolved in the Art. Explosion welding which, thus, is a type of explosive jointing, provides a joint whose strength comprises the continuous material interface. Thus, the same unifying forces will be obtained in the joint as in the rest of the material. The majority of prior Art proposals relating to explosion welding of pipelines entail joining both of the butting pipe ends to a common joint sleeve. In order to avoid deformation of the pipe and the sleeve by the shock wave, all prior Art methods and devices call for different types of supports or backups on the opposite side of the pipe wall to the explosive (see FIG. 3).

The second type of explosion jointing entails coldworking of the pipe end by means of an explosive charge, so that the end forms a shrink joint together with a joint sleeve. It is also possible to cold-work the joint sleeve per se. It is further possible to form a shrink joint directly between the pipe ends without the interposition of a joint sleeve (see FIG. 4).

Explosion jointing often comprises a combination of both of these connection types. If, for a shrink joint, use is made of an explosive with a VOD below the critical level for welded joints, the result will be a wholly or partly welded surface in the shrink joint.

There has also been proposed in the Art an explosion jointing method for pipes, according to which the inner joint sleeve consists of a metal annulus which is located on the outer periphery of the internally disposed charge. The metal annulus is fixedly welded to, and across, both of the joint butts. At the same time, the outer sleeve, the pipe ends and the inner annulus form a shrink joint (see FIG. 5, Ref. 3).

BRIEF ACCOUNT OF THE INVENTION

For the explosive welding of large-diameter pipes, annular charges are required which may be simultaneously initiated throughout their entire circumference. The simultaneous ignition of the entire charge is of absolutely decisive importance. At the same time, to guarantee the commercial breakthrough of the method, it is necessary that the charge can be delivered as a unit to the worksite and simply be fitted with a requisite ignition cap or detonator and pushed home in the pipe in question. The present invention relates to such a charge which, moreover, possesses such physical, chemical and mechanical properties that it can also be used on the sea bed.

The charge according to the invention comprises four major components joined together to make a unit, namely an effective charge, an ignition—or booster—disk, an obstruction—or tamper and a buffer (see FIGS. 6, 7).

The effective charge, which is, thus, annular and is adapted to suit the inner diameter of the pipe, is that part of the charge which realizes the welding and/or cold-working. It consists of a secondary explosive, preferably pentyl, a polymer binder simultaneously employed to reduce the VOD of the charge, a high-density filler to increase the density of the charge, and gas blisters in the form of air-filled microspheres of glass or polymer material in order to reduce the critical diameter of the charge and reliably guarantee complete ignition. To some degree, the composition of the charge is determined by the material thickness of the pipes, since greater material thickness requires a higher impulse.

The function of the booster disk is to propagate the detonation wave from the ignitor to the entire circumference of the effective charge simultaneously. The booster disk is of planar, copolar or conical configuration and is centrally provided with a mounting position for an ignitor, and is fixedly connected along its periphery to the effective charge. It consists of pentyl which has been embedded in the same thermosetting resin as employed for the effective charge. Since the charge and booster disk are cast in the same thermosetting resin, it is possible to interconnect them chemically. This affords a considerable advantage since there is no risk of disengagement. This is important, since the effective charge must be ignited throughout all of its circumference at the same time. If the charge were not to be initiated about its entire circumference, the result could be disastrous, since the asymmetrical impulse which then occurs would entail that two detonation shock waves are formed which collide somewhere about the working surface.

In this case, the material would be destroyed and there is a risk that splinters be flung out. Since the booster disk is not intended to carry out any welding work, no restrictions on its VOD and impulse are necessary. The only technical requirement is that it propagate the detonation from the ignitor without the risk of hiatus. Besides, it would be advantageous from the economic point of view to reduce the amount of explosive in the booster disk to a minimum. A booster disk consisting of 60% by weight of pentyl and 40% by weight of thermosetting resin of a thickness of 4 mm has a VOD of 6,000 m/sec.

The tamper consists of a material of high density such as a powdered metal which is cast in the same thermosetting resin as the effective charge. It can be fixedly cast to the charge in the same manner as the booster disk. The tamper is disposed on the inside of the charge, i.e. on that side which is facing away from the inside of the pipe.

The buffer consists of some non-explosive material. For example, it may consist of the same thermosetting resin as in the effective charge. The buffer is to fill out the space between the outside of the effective charge and the inner wall of the pipe. Suitably, it is fixedly cast or glued to the effective charge. The buffer may also consist of a soft plastic material which, at the same time, functions as a mould in manufacture. In such an event, the buffer will also form a sheath surrounding the entire charge.

The component parts of the charge may also be glued together if they are manufactured separately.

This charge is supplied ready-to-blast to the user. The charge remains completely homogeneous with respect to its composition, since all components are embedded in a plastic matrix.

The application of the charge against the working surface simply means that it is inserted into the pipe end. In order that this be possible, the charge must be slightly elastically deformable, since pipeline pipes are often not dead circular. Thus, it is of no help to manufacture the charge with low dimensional tolerances if it is rigid. By selecting a suitable thermosetting resin for the charge and a soft casing or sheath, where applicable, it is possible to impart suitable elasticity to the charge. Once the charge has been set, an ignitor or blasting cap is screwed in place in the hole provided for this purpose in the booster disk. To this end, a special ignitor has been developed at Nobel Industrier Sverige AB. This ignitor is characterized in that it provides a symmetric detonation wave in the plane of the booster disk and is of dual functional reliability.

When the intention is to carry out explosive welding using an internal joint ring which is fixedly across the butt joints between the adjacent pipe ends, the charge is forced or cast home in the joint ring before this is mounted in place. The joint ring can be used as a mold for the effective charge. It may also have previously been provided with an internal groove to ensure that the charge is held in place.

The joining of pipelines on the sea bed is an extremely costly procedure using conventional welding. In these contexts, it is, therefore, a highly attractive proposition to employ explosive welding. The charge according to the present invention is particularly nicely suited for this purpose. For such use, it is necessary that the charge be, first, water-resistant, and, secondly, incompressible by the water pressure. The first requirement is met in that the charge is embedded in water resistant binder, preferably polyurethane. The second requirement entails that the charge may not contain soft pores, but must, at the same time, contain air blisters as has been mentioned above. We have solved this problem by mixing the charge in vacuo and adding air blisters in the form of pressure-resistant microspheres with glass or polymer walls. Since the components are mixed in vacuo, the final product will be completely free of compressible air blisters.

The charge according to the invention may be cast or compression molded to its contemplated form. Its multifarious components may also be joined together in several different ways, as will be apparent to the skilled reader of the following discussion.

When the charge according to the invention is cast, this may be effected in molding tool which is employed for a large number of subsequent moldings, or the charge may be cast in single-use molds.

A molding tool which is to be used many times may be constructed of metal, polyurethane foam, wood, silicon or the like. As a rule, it must be treated with a slip agent before use.

Suitably, the tool consists of several parts, which makes possible the combined casting of effective charge, booster disk, tamper and buffer to one another. The casting of a new part to an already cast component must take place after polymerization in the already cast component has proceeded to such an extent that the new mixture is not diffused in the old. When the same polymer type is included in the different parts, it is an advantage if the already cast component is not completely polymerized.

The buffer may consist of any ready-made material, such as a rubber matting. This may be fixedly cast or glued to the outer periphery of the effective charge.

When single-use molds are employed, these may form a sheath surrounding the charge after the molding operation. The single-use molds may consist of a soft plastic material and may be manufactured by hot pressing or vacuum forming. They may also consist of a thermosetting resin and be cast. If the single-use mold is to be retained in place, it must, like the charge, be elastically deformable in order to adapt to the contours of oval configuration in the pipe end.

In batch molding of the effective charge and the tamper, it is important that no sedimentation take place in the mold. This can be avoided if the polymerization has proceeded to such a degree that viscosity has become sufficiently high before the next component is cast. This is facilitated if the casting compositions are initially of high viscosity. For the manufacture of charges for submarine applications, it is necessary, as mentioned above, to mix the components in vacuo. This is also advantageous for mixing of highly viscous molding compositions for onshore charges, since the air which is admixed to the molding composition cannot depart once the viscosity has become high. The molding operation proper should also be effected in vacuo. On casting of compositions which are so highly viscous that the mixture is not pourable, it may be forced from the mixing vessel into the mold, or drawn into the mold using a vacuum.

The component parts of the charge may also be cast separately in order to be subsequently glued together or united by some other suitable means.

Several booster disks can be cast simultaneously in a large planar mold which may consist of a wooden board with upstanding sides, surface treated with silicon, or a teflon (R) coated metal mold. It is then possible to cut out several booster disks from the molded blank. The booster disks may also consist of rolled sheet explosive.

Several effective charges can be cast simultaneously in one mold. The mold is a tall ring which may consist of metal, polyurethane, silicon or other suitable material. The molds must be surface-treated. After curing, the mold is opened and several effective charges can be cut or sawn out of the molded body. Several tampers may similarly be cast simultaneously in a corresponding manner, either separately or already interconnected with the effective charge at the initial stage of preparation.

The buffer may consist of a rubber matting or some other lightly flexible material which is fixedly glued to the periphery of the effective charge. It may also be fixedly cast to the effective charge. In this procedure, the buffer material is anchored to the inner surface of the mold which is most proximal to the outer periphery of the effective charge. During the casting and molding, the buffer fastens to the effective charge and releases from the mould when the mold is opened.

A sheet explosive containing 50-90% by weight, preferably approx. 60% by weight of explosive may be used for manufacturing the booster disk for the charge according to the present invention.

As has been mentioned above, the charge according to the present invention may be manufactured by means of pressing. The plastic is, in this instance, initially fixed to the solid particles of the charge. This may be effected by granulation in slurry. The various components of the charge are thereafter produced by compression of the granulated particles. The pressing operation may be effected in vacuo. Depending upon the type of plastic involved, hot pressing may be necessary. After the pressing operation, the different components are joined together by a gluing or pressing operation.

The choice of polymer binder in the charge according to the present invention is determined first by the requisite mechanical properties of the charge, secondly by the fact that the charge must be storage stable and thirdly by the method of manufacture employed.

Since the plastic may be included to a proportion of approximately 50% by weight in the charge, the mechanical properties of the plastic determine to a high degree the mechanical properties of the charge. The charge must have a certain elasticity in order to be able to accept oval configurations in pipelines, and it must retain its elasticity and dimensional stability in all climates. On storage, no breakdown—or degradation—of the explosive may take place, in other words the plastic must be compatible with the explosive and the remaining components, such as microspheres and powdered metal. If pressing is employed as the manufacturing method, the plastic must, moreover, be pressable.

In batch molding, the polymerization must not result in rapid exotherm, since this constitutes a safety risk.

In pressing, use should be made of a pressable plastic, for example a thermoplastic. This may, for example, be a fluorated polyvinyl of the type Viton (R), or thermoplastic polyurethanes.

In casting, some thermosetting resin system should be used. Polyurethane elastomers are of primary interest for their mechanical properties.

In the application of the method according to the present invention, polyisocyanates or unitary substances or mixtures thereof may be employed. The polyisocyanates must have at least two isocyanate groups. Polyisocynates with up to six isocyanate groups may be employed. The polyisocyanates may have aliphatic, cycloaliphatic, araliphatic, aromatic or heterocyclic molecular structure. As examples of usable polyisocyanates, mention might be made of the following substances:

2,4-toluene di-isocyanate and 2,5-toluene di-isocyanate or their isomeric compounds, diphenyl methane-4,4-di-isocyanate, diphenyl dimethyl methane-4,4-di-isocyanate, triphenyl-4,4,4-tri-isocyanate, phenylene di-isocyanate-1,4,2,2-6,6-tetra-methyl diphenyl methane-4,4-di-isocyanate, diphenyl-4,4-di-isocyanate, diphenyl ether-4,4-di-isocyanate, or their halogen-substituted derivates, 2,6-di-isopropylene-1,3-di-isocyanate, m-xylene-di-isocyanate, p-xylene-di-isocyanate, tetramethyl-p-xylene di-isocyanate, dimer toluene-2,4-di-isocyanate, hexane-1,6-di-isocyanate, cyclohexane-1,4-di-isocyanate, 1,2,3,4,5,6-hexahydrodiphenyl methane-4,4-di-isocyanate and naphthalene-1,5-di-isocyanate.

Instead of the above-mentioned polyisocyanates, a multiplicity of addition products with isocyanate end groups may be put into employment. These addition products are manufactured such that a polyhydroxy compound is reacted with polyisocyanate in such a proportion that there is obtained at least two isocyanate groups per molecule in excess. In certain cases, the excess of isocyanate groups may amount to six per molecule.

The polyhydroxy compounds employable for a manufacturing process according to the present invention may be summarized under the heading of polyethers. These polyethers may, in their very nature, be based on aliphatic or aromatic molecular structure. The number of hydroxy groups per molecule available for reaction with the polyisocyanates may vary from two to six. As examples of such compounds, mention might be made of such as are manufactured with aliphatic diols, triols, tetrols, pentols and hexols, as well as aliphatic diamines, as initiators containing two to six carbon atoms. By the addition of ethylene oxide, propylene oxide or tetrahydrofurane to the initiators, there will be obtained do to hexo-functional products with molecular weights varying between 100 and 10,000.

These above-described polyethers are aliphatic compounds. However, for producing the molding compositions according to the invention, aromatic-based polyethers with five or six linked rings may advantageously be used. Examples of such compounds are reaction products between ethylene oxide, propylene oxide and tetrahydrofurane, respectively, and di-hydroxy-diphenyl methane, di-hydroxydiphenyl propane, di-hydroxydiphenyl or di-hydroxy-hydantoin.

These aromatic polyethers are embraced in the following general formulae:

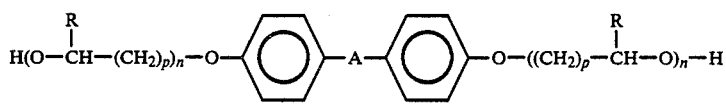

or

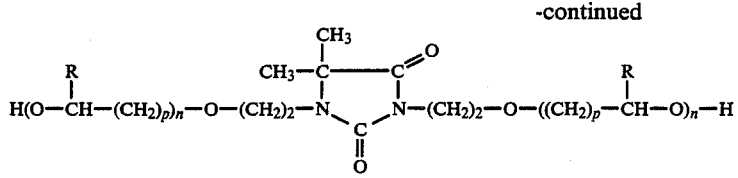

wherein A designates a single bond, $$-CH_2- \text{ or } -\underset{CH_3}{\overset{CH_3}{\underset{|}{\overset{|}{C}}}}-$$

and
  p=1 and R=H or CH$_3$
  p=3 and R=H
and
  n=1-5

The molecular weight of these compounds lies between 300 and 800. These above-described compounds react with polyisocyanates by polyaddition.

The following systems are usable thanks to their low viscosity, low exothermic level and long pot life:

Isophorone-di-isocyanate(3-isocyanatomethyl-3,5,5-trimethyl cyclohexyl-isocyanate).

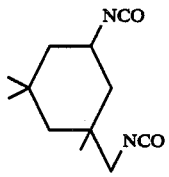

or 2,2,4-trimethyl hexamethylene di-isocyanate

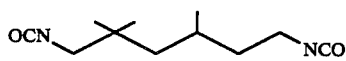

or 2,4,4-trimethyl hexamethylene di-isocyanate

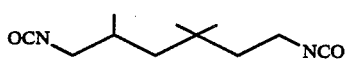

or their isomeric mixtures (ratio 1:1).

The NCO content of these isocyanates must lie between 30 and 40%.

As polyhydroxy compounds, use is preferably made of polyethers on a caprolactone basis.
  caprolactone

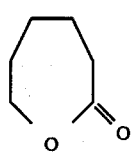

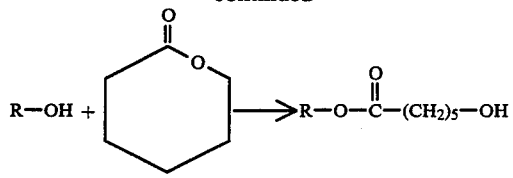

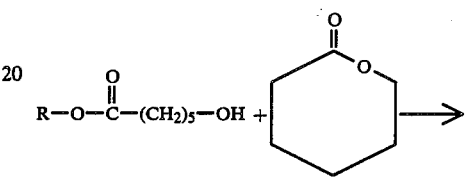

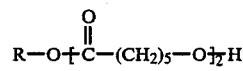

R=may be any optional OH terminated compound. However, the condition is that the OH group be primary.

Functionality:

| | | |
|---|---|---|
| 2 functional: | HO | OH. |
| 3 functional: | HO | OH |
| | | OH |
| 4 functional: | HO | OH |
| | HO | OH |

Polyesters suffer from the disadvantage that they are often highly-viscous, brittle and give a rapid and high temperature elevation on polymerization.

Low-viscosity polyester systems include harmful monomers. The catalyst types employed for polymerization of polyesters are inhibited by nitro compounds and nitrate esters. Consequently, polyesters are unsuitable for this purpose.

On the other hand, silicons which have elastic properties can be employed, at least in certain cases. Moreover, they set fully at room temperature without rapid exotherms. On the other hand, their price is distinctly unfavorable as compared with isophorone based polyurethane systems. Moreover, viscosity is often higher for the silicon systems. Nor is the strength of silicon as high as the polyurethane systems. On the other hand, epoxy resins cannot, as a rule, be used, since their catalysts are often incompatible with the explosive.

EXAMPLE

Charges for the welding of gas pipes of an outer diameter of 595 mm and a material thickness of 8 mm were manufactured as follows:

The plastic consisted of an isophorone-based polyurethane system with a low-molecular polyol. The polymerization for this system is slow but complete with a pot life of one hour without filler. Mixing was carried out in a planetary-type agitator of the Planetron make. The polyol and isocyanate were mixed for 20 minutes in vacuo.

Thereafter, glass microspheres of the 3 M, SS/X manufacture were added at an amount corresponding to 5% by weight and zinc powder ECKA MP 3/129/G at an amount corresponding to 20% by weight. The slurry was mixed for 40 min. in vacuo, whereafter crystalline pentyl of the Nobelkrut NSP 19 manufacture was added at an amount corresponding to 30% by weight. The mixture was agitated in vacuo for a further 10 min.

A total of 6 kg. was mixed. Mixing was carried out at room temperature. The reaction exotherm gave rise to a temperature elevation of less than 10° C. during the mixing process.

Thereafter, the charge was cast in an annular mold consisting of silicon of the Wacker Kemi, RTV-ME 622 A+B manufacture. The charge was left to cure for 12 hours at room temperature before being removed from the mold.

The tamper consisted of equal parts by weight of zinc powder and polyurethane plastic according to the above. The component parts were mixed for 60 min. in the planetary-type mixer. The tamper was cast in an annular mold whose outer side consisted of the inner side of the effective charge. The bottom and inner sides consisted of silicon. In this manner, the tamper was fixedly cast to the effective charge.

The booster disk consisted of 45% by weight of polyurethane plastic, 40% by weight of coarse-grained pentyl of the Nobelkrut NSP 19 manufacture, and 19% by weight of fine-grained pentyl of the Nobelkrut NSP 13 manufacture, and finally 1% by weight of lecithin.

The components were mixed for 10 minutes in vacuo in the planetary-type agitator. Thereafter, the mixture was poured into a mold consisting of a polystyrene panel which had been placed on the upper edge of the ring constituted by the effective charge and the tamper. The polystyrene panel covered only that part of the top edge which had its counterpart in the tamper.

A side wall upstanding approx. 1 cm above the top edge was placed on the outer periphery of the effective charge. The side wall consisted of 1 mm thick polystyrene panel.

An amount which correspond to a 4 mm thick booster disk was poured onto the mold surface. The mixture flowed-out to an even layer and fixedly cured to the upper edge of the effective charge which was not covered by the polystyrene panel.

In this method of manufacture, the polystyrene panel becomes a part of the charge. A 1 mm thick rubber sheeting was glued to the outer periphery of the effective charge as a buffer. In the middle of the booster disk, a 5 mm diameter hole was cut out of the ignitor or detonator. The charge was applied in the pipe end. Even when the ovality of the pipe was 1 cm out of true circular, the charge was sufficiently elastic to abut against the working surface. Thereafter, an ignitor which has been specially developed at Nobel Industrier was screwed in place in the hole in the booster disk. Thereafter, the pipe end was explosion welded to an outer joint sleeve. The joint was found to be complete using ultrasonic testing, and neither the joint sleeve nor the pipe were damaged. A tensile test was carried out on a segment of the joint. The material failed, but not the welded joint (see FIG. 8).

Another charge which was manufactured in the same manner as the charge above was employed to check the simultaneity of the detonation wave between points of symmetry in the charge. The simultaneity was confirmed by registering the detonation wave with the pentyl fuse and witness plates. We found that the detonation was simultaneous throughout the entire charge. A compatibility test was effected using microcalorimetry at 70° C. for 10 weeks. No exotherms or endotherms were registered. This corresponds to a storage life of at least 6 years at room temperature.

DESCRIPTION OF THE ACCOMPANYING DRAWINGS

Figure 1:
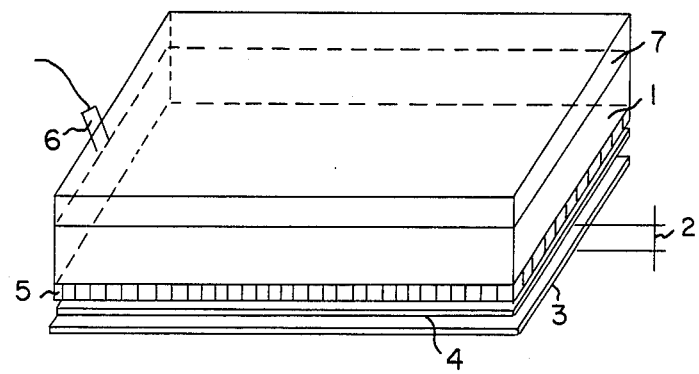
FIG. 1 shows, in oblique projection, the conventional configuration in all explosion welding. In explosion welding of pipes, the configuration has a radius of curvature which is equal to that of the pipe.

The arrangement shown in FIG. 1 comprises a charge 1, an acceleration gap 2, a base plate 3, a cover plate 4 and a buffer 5. A detonator 6 and a tamper 7 are also included.

Figure 2:
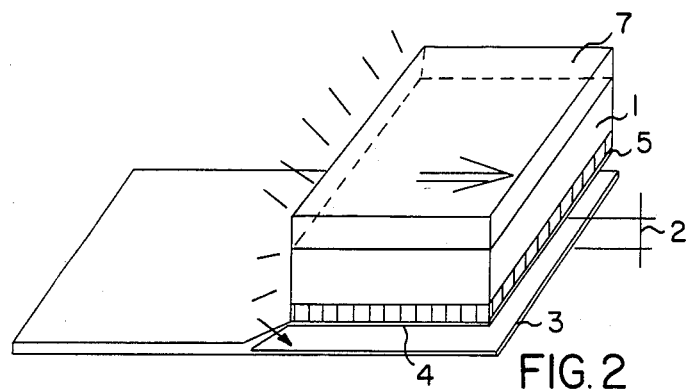
FIG. 2 shows how the cover plate according to FIG. 1 is accelerated towards the bottom plate by the impulse from the detonation wave through the charge.

The same details are included in FIG. 2 as in FIG. 1. When the charge 1 is detonated, the activity illustrated in FIG. 2 occurs as the cover plate 4 is accelerated towards the base plate 3 by the impulse from the detonation wave.

Figure 3:
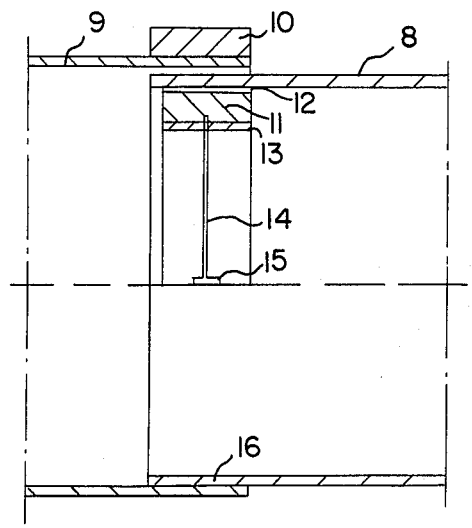
FIG. 3 shows a section through the configuration for explosion welding of pipes. The upper part of the Figure shows the position prior to the explosion welding, and the lower the subsequent position.

The arrangement illustrated in FIG. 3 includes a pipe 8, a joint sleeve 9, and an outer support or back-up 10. The explosion welding charge consists of the charge 11 proper, a buffer 12, a tamper 13, a booster disk 14 of explosive material, and a detonator 15. The finished joint in the lower half of the Figure is designated 16.

Figure 4:
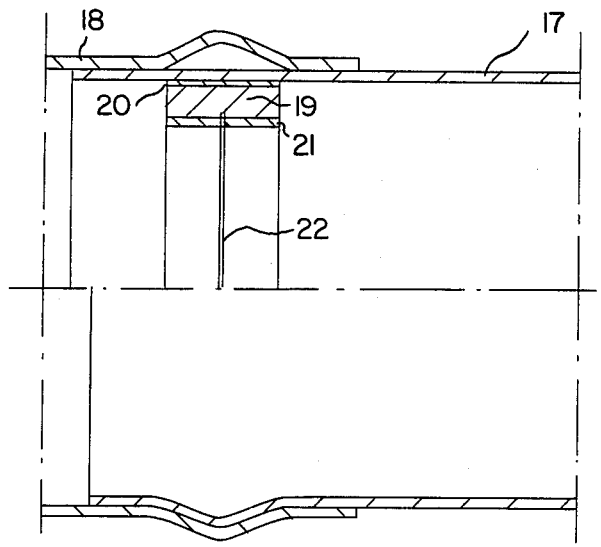
FIG. 4 shows a section through the configuration for explosion jointing of pipes by cold-working which gives a shrink joint. The upper half of the Figure shows the position prior to the jointing and the lower the subsequent position.

The configuration illustrated in FIG. 4 includes a first pipe 17, a second pipe 18, an effective charge 19, a buffer 20, a tamper 21 and a booster disk 22. The detonator is not shown in the Figure.

Figure 5:
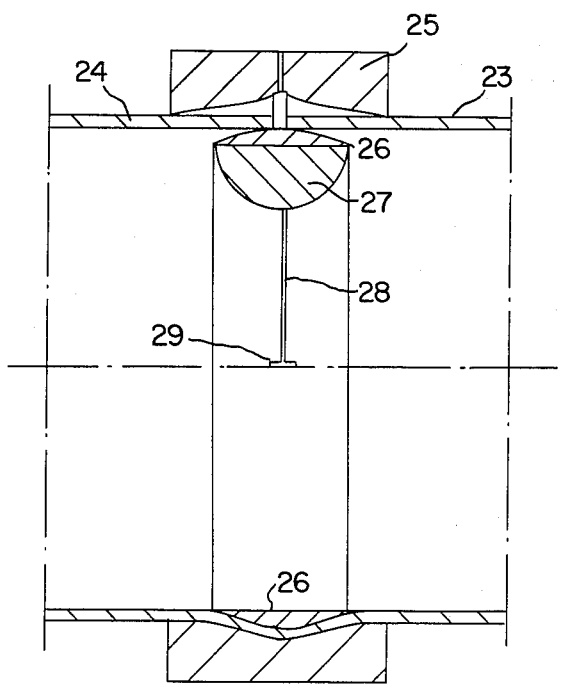
FIG. 5 shows, in a manner corresponding to FIGS. 3 and 4, a configuration which gives both shrink joint and welded joint.

FIG. 5 includes a first pipe 23, a second pipe 24, a joint sleeve 25, an inner metal annulus 26, an effective charge 27, a booster disk 28 and a detonator 29.

Figure 6:
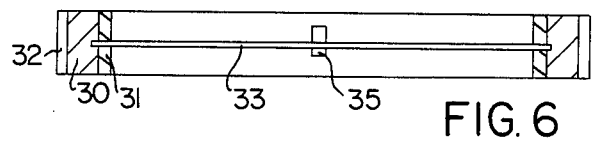
FIGS. 6 and 7 are cross sections through different types of charges.
Figure 7:
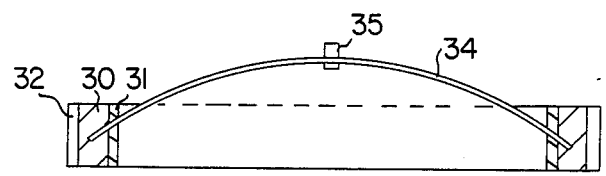

The explosion welding charges shown in FIGS. 6 and 7 include the effective charges 30 proper, tampers 31, buffers 32, and a planar booster disk 33 according to FIG. 6, and a bellied booster disk 34 according to FIG. 7. Detonators 35 are, moreover, included.

Figure 8:
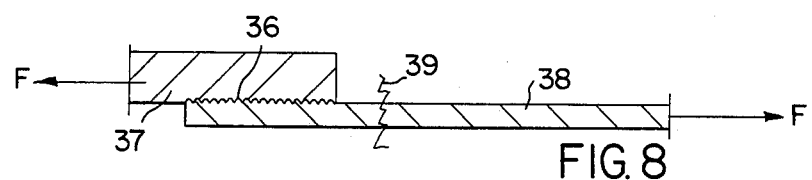
FIG. 8 is a section through a general arrangement in a tensile test of an explosion welded joint between pipe and joint sleeve.

In the tensile test of an explosion welded joint illustrated in FIG. 8, the explosion weld proper is designated 36, while a part of the joint sleeve is designated 37 and a corresponding part of a pipe 38. The force arrows F mark the loading during the tensile test proper, while the site of the final failure is designated 39.

REFERENCE LIST

1. William O. Munson Sheet Explosives Studies Thiokol/Wasatch Division Technical Report No. AFWL-TR-73-19
2. Bertham et. al. Molded explosive bodies having variable detonation speeds U.S. Pat. No. 3,925,122.
3. I. Persson, B. Persson Joint connections for joining two pipe ends. SE. Pat. No. 8303264-9.

What we claim and desire to secure by Letters Patent is:

1. An explosive charge for explosive jointing comprising an annular effective charge containing a secondary explosive;
    a booster disk produced from at least one secondary explosive and having a circular outer periphery and a centered detonator opening for mounting of a detonator united with said annular effective charge throughout its entire outer periphery;
    a buffer of an elastically deformable material that covers the outer side of the effective charge facing the object that is to be explosively jointed and bridging the distance thereto;
    a high density temper material covering the inner side of the effective charge counter-directed away from said object to be explosively jointed;
    wherein the same type of explosive and polymer binder are included in both the booster disk and the effective charge;
    said effective charge further including a high-density substance compatible with the other components of the effective charge and being selected from the group of metal, metal oxide powder, and mixtures thereof;
    wherein said explosive charge further includes gas blisters in the form of air-filled microspheres of glass or polymer material; and
    wherein said high-density tamper material includes powdered metal and the same polymer binder as in said effective charge.

2. The explosive charge as claimed in claim 1, characterized in that the effective charge contains 30-70% by weight of explosive, 20-60% by weight of polymer binder, 20-40% by weight of metal or metal oxide powder, and 5-10% by weight of air-filled microspheres.

3. The explosive charge as claimed in claim 1, characterized in that the booster disk contains 50-80% by weight of explosive, 20-50% by weight of polymer binder.

4. The explosive charge as claimed in claim 1, characterized in that the booster disk, the effective charge, the buffer and the tamper are united to form a unit.

5. The explosive charge as claimed in claim 1, characterized in that the effective charge and the booster disk are cast in one and the same lost mold of an elastically deformable polymer material, the outer wall of the mold forming the buffer about the effective charge.

6. The explosive charge as claimed in any one of claim 1, characterized in that the booster disk is bellied or slightly conical.

7. The explosive charge as claimed in claim 1, characterized in that an isophorone-based polyurethane is included as binder in at least the effective charge and the booster disk.

8. The explosive charge as claimed in claim 7, characterized in that the polyurethane included as binder in the booster disk and the effective charge is based on one of the following di-iso-cyanates with NCO contents of between 30 and 40%:

Isophorone di-isocyanate

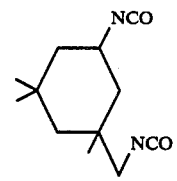

or 2,2,4-trimethylhexamethylene dio-isocyanate

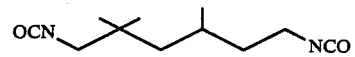

or 2,4,4-trimethylhexamethylene di-isocyanate

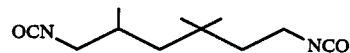

or their isomeric mixtures (preferably in the ratio 1:1) and a suitable polyether.

9. The explosive charge as claimed in claim 8 wherein said polyether is a di-, tri-, or tetra-functional caprolactone having a hydroxyl number of 100 to 1000.

10. The explosive charge as claimed in claim 8, characterized in that the polyether consists of ethylene or propylene oxide.

11. A method of producing an explosive charge as claimed in any one or more of claims 1 to 7, characterized in that the component parts of the charge are individually and mutually successively cast in the same mold, the polymer binder which is included in each component part in different percentage proportions constituting the common ingredient in all of these component parts.

12. The method as claimed in claim 11, characterized in that the charge is mixed and cast in vacuo.

13. The explosive charge as claimed in claim 2, characterized in that the booster disk contains 50-80% by weight of explosive, 20-50% by weight of polymer binder.

14. The explosive charge as claimed in claim 2, characterized in that the booster disk, the effective charge, the buffer and the tamper are united to form a unit.

15. The explosive charge as claimed in claim 3, characterized in that the booster disk, the effective charge, the buffer and the tamper are united to form a unit.

16. The explosive charge as claimed in claim 2, characterized in that the effective charge and the booster disk are cast in one and the same lost mold of an elastically deformable polymer material, the outer wall of the mold forming the buffer about the effective charge.

17. The explosive charge as claimed in claim 3, characterized in that the effective charge and the booster disk are cast in one and the same lost mold of an elastically deformable polymer material, the outer wall of the mold forming the buffer about the effective charge.

18. The explosive charge as claimed in claim 2, characterized in that the booster disk is bellied or slightly conical.

19. The explosive charge as claimed in claim 2, characterized in that an isophorone-based polyurethane is included as binder in at least the effective charge and the booster disk.

20. A method of producing an explosive charge as claimed in claim 2, characterized in that the component parts of the charge are individually and mutually successively cast in the same mold, the polymer binder which is included in each component part in different percentage proportions constituting the common ingredient in all of these component parts.

21. The explosive charge of claim 9 wherein said hydroxyl number is about 200.

22. The explosive charge of claim 1 wherein said secondary explosive includes at least one material selected from the group of TNT, pentyl, hexogene, octogene, and ammonium nitrate.

* * * * *